Patented Feb. 23, 1937

2,072,015

UNITED STATES PATENT OFFICE 2,072,015

PROCESS FOR THE TREATMENT OF UNSATURATED HALIDES

Miroslav W. Tamele and Herbert Peter Augustus Groll, Berkeley, Calif., assignors to Shell Development Company, San Francisco, Calif., a corporation of Delaware No Drawing. Application October 4, 1932, Serial No. 636,176

9 Claims. (Cl. 260—156)

Our invention deals with the treatment of unsaturated organic halides, especially of halogen substitution products of unsaturated, aliphatic hydrocarbons, such as olefines which may be further substituted, with materials of a basic nature for the production of alcohols, aldehydes, ketones, amines and other useful compounds obtainable thereby.

While methods of treating saturated aliphatic halides with alkalies and other basic materials are well known in the art and are used for the manufacture of numerous chemicals, no processes are available at present for the similar treatment of unsaturated halides and many of the products derivable therefrom are not available.

In the specification to be set forth hereinafter, we will describe our process as applicable to the treatment of chlorine-substituted derivatives of olefine hydrocarbons, but we do not intend this to be considered as a limitation, either with respect to the species of halogen present in the compound, with respect to the number of halogen atoms present in each molecule of the compound, or with respect to the type of unsaturated organic compound.

For the purpose of our invention, halogen-substituted unsaturated aliphatic hydrocarbons may be divided into two classes according to their chemical properties. Those in which the halogen is joined to a carbon atom having only single bonds form one class and may be represented by the structural formula

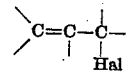

wherein the loose bonds may be taken up by hydrogen, halogen, alkoxy, amino, alkyl, aryl, aralkyl, etc. substituents which group substituents may or may not be further substituted.

$$CH_2=CH-CH_2-Hal$$

is the simplest member of this series which becomes more complex as we deal with compounds containing a larger number of carbon atoms to the molecule as

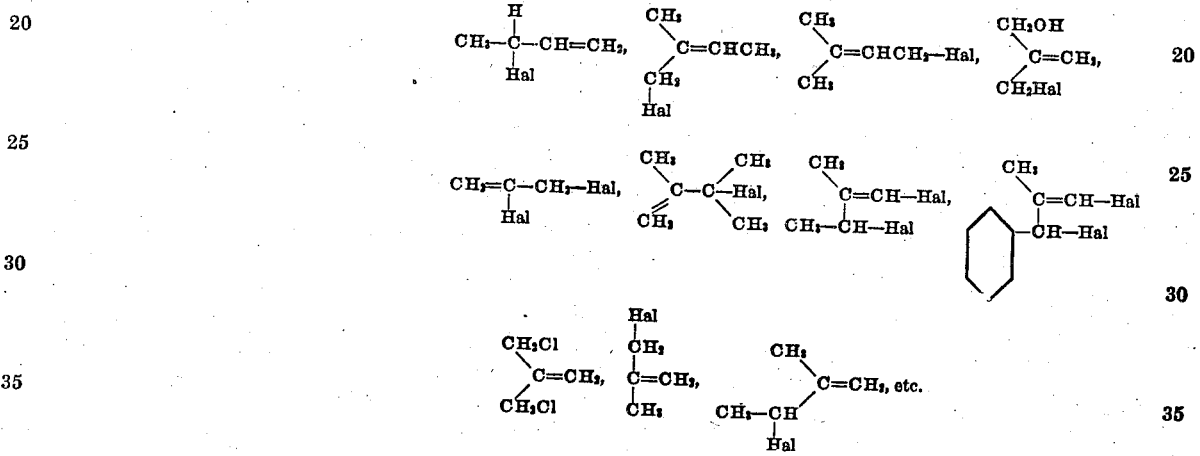

Those in which the halogen is joined to a carbon atom linked to a second carbon atom by a double or triple bond, form another. In the present application we disclaim, as part of our present invention, the treatment of halogen-substituted products of unsaturated organic compounds wherein the halogen atom is joined to a carbon atom linked to a second carbon atom by a triple bond. The genus subaltern in the second group, which is pertinent for our present purpose, is the one which possesses the vinyl structure which may be structurally illustrated thus:

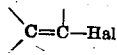

wherein the loose bonds may be taken up by the hydrogen, halogen, alkoxy, amino, alkyl, aryl, aralkyl, etc. which group constituents may or may not be further substituted. CH₂=CH—Hal is the simplest member of this series which becomes more complex as we deal with compounds containing a larger number of carbon atoms to the molecule as

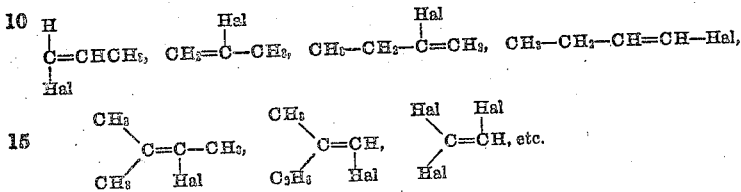

Those which resemble allyl halides, that is, members of the first class, are much more reactive than the corresponding halides of the saturated radicals, while members of the second class are comparatively inert. For purposes of convenience, members of the first group will be designated as being of the allyl type.

We have found that, in general, the chlorine in the allyl type chlorides is much more reactive than in the corresponding vinyl type compounds. This enables us to treat mixtures of the two chlorides with certain reagents in such a way as to transform the allyl type chlorides into compounds of a different nature, that is, alcohols, aldehydes, ketones, esters, amines, etc., while the vinyl type chlorides remain substantially unaffected. This selective reaction has several useful applications and will be referred to later.

When the unsaturated chlorides of the allyl type are caused to react with chemicals of a basic nature, a number of various compounds may be formed and we have developed our process so that by the selection of the reagent and by careful regulation of temperature and pressure in the reaction chamber, we are able to direct the process toward the predominant formation of the desired product.

When the allyl type halide possesses also a vinyl halide group, the allyl group will enter into the reaction characteristic of the allyl type compounds, while the vinyl group will remain substantially unattacked.

If we desire an unsaturated alcohol as the main product, we employ a base of strongly alkaline nature, such as a hydroxide of an alkali- or alkaline earth-metal and react this with the unsaturated chloride or chlorides at temperatures between about 80° and 250° C. While the reaction does proceed at lower temperatures, that is 65° to 70° C., its rate in this range is very low and inconveniently large reaction vessels are required for a given rate of production. On the other hand, high temperatures promote the formation of aldehydes and ketones as well as polymerization and condensation products and thereby decrease the yield of alcohol, especially if there is not enough agitation. This is due to local acidity.

Aldehydes or ketones also may be formed by the metameric rearrangement of the unsaturated alkenyl alcohols formed by the hydrolysis of the chlorides. We have found that this rearrangement is greatly promoted by the acidity of the medium and may occur in any portion of the reacting mass where local acidity develops through the liberation of hydrochloric acid by the hydrolysis. To avoid this when producing alcohols, we prefer to keep the reacting mass thoroughly agitated until the hydrolysis is substantially complete, so that all hydrochloric acid liberated is instantly neutralized by the alkali. This agitation should keep step with the rate of reaction, that is, it should be more vigorous at higher temperatures.

In order to dispense with large pressure vessels equipped with agitating means, we prefer to use a tubular reaction vessel, made of pipes connected in series or in multiple through which the reacting mass of chloride, base and water is caused to flow at the desired rate. Throughout the length of the tubes, orifice plates may be provided at such intervals as to keep the mass in violent turbulence. The tubular reactor is divided into two main parts. The first of these is placed into a furnace, or steam jacket, or other suitable heating medium, and serves to raise the temperature of the mass to between about 80° and 250° C. and thereby to initiate the reaction. The second part of the reactor is placed outside the heating medium and so arranged that either by heat loss to the surrounding atmosphere or by cooling with a suitable medium, it dissipates a quantity of heat substantially equal to that liberated within it by the reaction. In this manner, the process can be executed as a continuous operation.

As it is preferable to carry out the reaction while the reagents are in the liquid phase, it is necessary to maintain in the reactor a pressure at least equal to the combined vapor pressure of the reactants and products at the working temperatures and proper provisions are made for this. We prefer to operate under superatmospheric pressures since these allow us to apply higher temperatures which increase the velocity of reaction. The high pressure also tends to maintain most of the halogenated unsaturated organic compounds in solution to permit the reaction to proceed substantially to completion. If we desire to produce aldehydes or ketones by reacting alkenyl chlorides with bases, a slight acidity within the reacting mass is advantageous. For this reason, we employ bases of only a weakly basic nature, such as basic lead acetate, bismuth subnitrate, bismuth subcarbonate, lead hydroxide, ferrous hydroxide, ferric hydroxide and the like, and use preferably the bicarbonates of alkali-metals or the carbonates of alkaline earth-metals. We avoid the use of strong alkalies as we have found that their presence in the reacting mass causes polymerization of the aldehydes or ketones formed. The same temperatures as above and corresponding pressures may be conveniently maintained in the reactor.

For the production of amines or ammonium bases, we react the unsaturated halides with aqueous or anhydrous ammonia or amines, which may be primary or secondary, and obtain thereby a novel series of compounds in which unsaturated hydrocarbon radicals, which may be further substituted, replace one or more of the hydrogens in the nitrogenous body.

The recovery of the products of the reaction must be adapted to the nature of these products. If the products are high boiling and cannot be distilled without decomposition, we prefer to cool the reacted mixture and either allow it to separate into two layers, the products being recovered from one of these layers or if the mixture is homogeneous, such as is the case if the product is a glycol, we may use any suitable means of extraction, evaporation at normal or reduced pressure, etc. If the products are volatile we may prefer to distill them from the autoclave or discharge the hot mixture into a fractionating system.

*Example I*

As an example, we may start with the allyl type monochloride of gamma butylene, isobutenyl chloride, having the formula

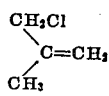

either in the pure state or in admixture with its homolog, di-methyl-vinyl chloride, having the formula $(CH_3)_2C=CHCl$. For the production of isobutenol,

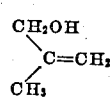

we react this in the manner described with a solution of strong alkali, i. e. a 12% aqueous solution of sodium hydroxide, proportioning the liquids so that from about 1 to 25% more alkali solution enters the reactor, than necessary to react with all the chlorine contained in the isobutenyl chloride being fed simultaneously. We select the concentration of the reagents so, that, when the reaction is complete, not more than about 30% alcohol is present in the liquid phase of the reaction products, and we prefer to keep the concentration between about 20% and 25%. A higher concentration was found to promote undesirable secondary reactions, like etherification.

The feed to the reactor is adjusted so that from 3 to 5 minutes will be required for any part of the mass to traverse the second (unheated) part of the reactor and the heat input to the heating coil is so regulated that the temperature of the reacting mass is between about 100° C. and 150° C. at the outlet of the heating section. Under these conditions it will be necessary to maintain a pressure not exceeding 250 lbs. per sq. in. in the reactor to prevent vaporization. Higher pressures may be necessitated by the resistance of the coil, etc. but this resistance is dependent on the design of the coil and the rate of feed.

Under the conditions and within the time specified, the isobutenyl chloride is substantially completely hydrolyzed to isobutenol while any dimethyl-vinyl chloride present remains substantially unchanged. From the reactor we continually discharge the reacted mass into a flash evaporator at approximately atmospheric pressure where, due to the reduction of pressure, the heat content of the liquid causes the alcohol, the unchanged dimethyl-vinyl chloride and some water to evaporate. If necessary, vaporization may be aided by heating the evaporator in any conventional manner.

The vapors evolved in the evaporator are further fractionated in a suitable column, alcohol, water and the vinyl type chloride being collected as distillate from the top of the column.

We have found that isobutenol and water form constant boiling (azeotropic) mixtures and have determined that at normal atmospheric pressure this mixture consists by weight of 65.8% alcohol and 34.2% water, its boiling temperature being 92.5° C. The vapors issuing from the top of the fractionating column contain isobutenol and water in this proportion. We have also found that when this vapor is condensed and the condensate cooled to about 15° C. to 20° C., it separates into two phases. The upper phase, approximately 76.0% by weight of the total consists, by weight, of 78% alcohol and 22% water. The lower phase, approximately 24% by weight of the total, contains, by weight, 20% alcohol and 80% water.

The upper phase may be further dehydrated, e. g. by distillation in a fractionating apparatus, in which case its water content is removed in the form of constant boiling mixture, or we may remove part of the water by "salting" prior to distillation. For either case, the anhydrous isobutenol having the boiling temperature of 114.2° C. at normal atmospheric pressure, remains behind. The alcohol present in the lower phase is distilled off as constant boiling mixture, leaving most of its water content behind.

Any dimethyl-vinyl chloride (B. P. 68.5° C.) distilling over with the alcohol-water mixture, greatly aids in the separation of the water. This chloride, while miscible in all proportions with isobutenol, is insoluble in water. When present in the distillate, its water-repellent action results in the upper phase of the condensate being richer in alcohol thereby aiding the dehydration of the latter. It is easily removed from the alcohol by distillation. The allyl type halides being more susceptible towards hydrolysis than any other type of halide, we now find that if any other type is present contemporaneously with the hydrolyzed allyl type halide and water, the water content can be quickly and simply eliminated by distillation from said alcohols in the presence of any of said other halides.

When operating the process as set forth, we obtain a yield of 94 to 96% isobutenol figured on the theoretical maximum obtainable from the isobutenyl chloride used.

When we desire to convert the isobutenyl chloride to isobutyraldehyde, we operate in a similar manner, using a slurry of calcium carbonate in place of the alkali solution. The temperature in the reactor is maintained between about 80° C. and 225° C. and the products obtained are separated by distillation in a manner similar to that described. Besides the main product of isobutyraldehyde, we obtain as by-product isobutenol, isobutyraldol, octaglycol, isobutyl alcohol and salts of isobutyric acid and of hydroxy octylic acid.

*Example II*

154 lbs. of isobutenyl chloride containing some isocrotyl chloride and 750 lbs. of 10% caustic soda solution were placed in an autoclave equipped with a stirrer, heated up to 120° C. and stirred for 20 minutes.

From the reaction product a small amount of unchanged isocrotyl chloride (about 3%) was recovered by fractional distillation as azeotropic mixture with water (B. P. 60–70° C.), and 167 lbs. of the azeotropic mixture of isobutenol and water (boiling point 92.5° C.). This mixture contained 116 lbs. of isobutenol corresponding to 95% yield (on the chloride).

*Example III*

500 kg. (5.53 kg. mols) of isobutenyl chloride containing some isocrotyl chloride, and 2030 kg.

of 12% caustic soda solution containing 6.08 kg. mols of sodium hydroxide were mixed and fed by means of proportioning pumps into the tubular reaction system described in the specification. The tubular reactor was kept at 130–140° C. and the mixture was fed at such a rate that the contact time was about 4 minutes.

The reaction product was continuously discharged into an evaporating and fractionating system. In this first distillation an azeotropic mixture of isobutenol, unchanged isocrotyl chloride and water was eventually separated from the "spent alkali" which was being continuously discharged to waste. Only the top layer of this azeotropic mixture was collected, the bottom layer being continuously returned into the feed to the fractionating system.

The total distillate weighed 590 kg. By further fractionation, isocrotyl chloride was separated from this mixture as an azeotropic mixture with water (fraction boiling within 60–80° C.). What remained in the kettle was substantially a mixture of crude isobutenol and water. From the kettle 378 kg. (5.25 kg. mols) of dry isobutenol were eventually recovered, indicating that 95 mol. per cent of the chloride reacted to form isobutenol.

The isocrotyl chlorides recovered weighed 15 kg. (0.17 kg. mols) or 3 mol. per cent of the chlorides charged to the reactor. 2 mol. per cent of the chlorides were not accounted for (and may be charged to losses in operation).

*Example IV*

108.8 lbs. of isobutenyl chloride, 400 lbs. of water and 48.8 lbs. of calcium hydroxide were put into an autoclave, heated to 130° C. and vigorously stirred. The reaction was finished within 20 minutes.

From the reaction product 129 lbs. of the azeotropic mixture of isobutenol and water were recovered, containing 82 lbs. of isobutenol, or 95 mol. per cent referred to the original amount of the chloride.

Besides isobutenol, 2.6 mol. percent of isocrotyl chloride were recovered. 2.4 mol. per cent of the original chloride were unaccounted for.

*Example V*

31.4 kg. of crude chlorinated tertiary amylenes from petroleum fractions (isopentenyl chlorides) containing 15% of other chlorides, these chlorides consisting of monochlorides of pentane, methyl ethyl vinyl chloride, and trimethyl vinyl chloride, 13.2 kg. of sodium hydroxide, and 200 kg. of water were charged into an autoclave equipped with a stirrer. The autoclave was heated to 120° C. The reaction was completed within 20 minutes.

From the reaction product a mixture of substantially two unsaturated alcohols was separated which on fractionation yielded 12.5 kg. of 2-methyl butene-1-ol-3 azeotropic mixture with water boiled at 90° C. The alcohol itself when dried boiled at 115–116° C. and had a specific gravity of 0.841. The second fraction weighed 4.8 kg., boiled at 135–140° C., specific gravity 0.863 and was shown to be 2-methyl butene-2-ol-4, whose azeotropic mixture with water boiled at 96.3° C., composition; alcohol, 53.3%; water, 46.7%. These products represent a yield of 66% referred to the total chlorides, or 78% referred to the isopentenyl chlorides. The vinyl type chlorides and the pentane monochlorides were recovered substantially unchanged.

*Example VI*

2010 gm. (10 gm. mol.) of a mixture of the following isomeric chlorides:
1-phenyl 2-chloromethyl 3-chloropropene-2; 1-phenyl 1-chloro 2-chloromethyl propene-1; 1-phenyl 1-chloro 2-methyl 3-chloropropene-2 were mixed with 4400 gm. of 10% caustic soda (11 gm. mol. NaOH) and heated in an autoclave with good agitation for 30 minutes at 120° C.

The products of the reaction were the corresponding unsaturated chloro alcohols
1-phenyl 2-hydroxy methyl 3-chloropropene-2; 1-phenyl 1-chloro 2-hydroxy methyl propene-1; 1-phenyl 1-hydroxy 2-methyl 3-chloropropene-2.

The yield was almost quantitative.

*Example VII*

27.2 kg. of isobutenyl chloride and 33 kg. of calcium carbonate suspended in 200 kg. of water as a slurry were put into an autoclave provided with a stirrer. The autoclave was heated to 140° C. The temperature was then allowed to increase due to the heat of reaction to 150° C.; the pressure was 55 atmospheres.

From the reaction product 12.2 kg. of isobutyraldehyde and 4 kg. of isobutenol were separated, accounting for 80% of the chlorides used.

*Example VIII*

16 kg. of sodium hydroxide and 200 kg. of water were put into an autoclave, heated up to 170° C. The pressure in the autoclave was 23 atmospheres. 33.3 kg. of isobutenyl chloride were injected into the autoclave. The temperature rose to 180° C. due to the heat of reaction. The charge was then kept at this temperature for 60 minutes with stirring.

From the reaction product 6.6 kg. of isobutyraldehyde, 9.6 kg. of isobutenol and isobutyl alcohol mixture, 3.6 kg. of isobutyric acid, and 6.5 kg. of 2,2,4-trimethyl pentadiol 1,3 (octaglycol) were separated, the total products accounting for 96 mol. per cent of the chloride used.

If the reagent used is aqueous ammonia, the isobutenyl chloride is converted into amines of which we have prepared the following:

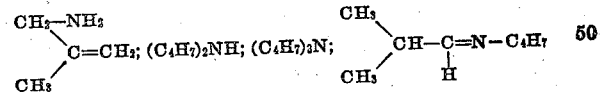

as well as others. The pentenyl chlorides can be converted into unsaturated amines in a similar fashion as can the other members of the allyl type halides, leading to novel products. From the homologous chlorides of amylenes we have prepared in a manner analogous to that described for the butenyl chlorides, compounds of corresponding constitution, and we have reliable indications to show that our process is equally well applicable to all homologs containing more than five carbon atoms, such as the hexylene, heptylene and higher halides.

*Example IX*

90.5 kg. of isobutenyl chloride and 18.6 kg. of ammonia dissolved in 150 kg. of water were charged into an autoclave, heated to 120° C. for 20 minutes.

From the reaction mixture the following products were separated: 1.5 kg. of low boiling amines (B. P. 69–70° C., B. P. 115–118° C.), 45 kg. of an amine, $C_8H_{15}N$ (B. P. 149° C., molecular weight 125), and 23 kg. of a mixture of high boiling amines boiling at 195° C. under atmospheric pressure partly with decomposition.

The term "unsaturated tertiary carbon atom" is used herein and in the appended claims to designate a carbon atom which is unsaturated and linked to three other carbon atoms. For example, the $C^{III}$ carbon atom in the formula of isobutenyl chloride,

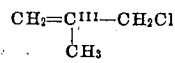

is an unsaturated tertiary carbon atom; it is linked by a double bond to one carbon atom and by single bonds to two other carbon atoms.

We claim as our invention:

1. A process for the production of unsaturated alcohols from allyl type unsaturated halides which comprises reacting an allyl type unsaturated halide containing at least four carbon atoms to the molecule with more than an equivalent quantity of a basic metal compound, in the presence of at least an equivalent amount of water at a temperature of from about 80° C to about 250° C. and at a superatmospheric pressure at least equal to the combined vapor pressures of the constituents of the reaction mixture at the operating temperature.

2. A process for the conversion of an allyl type unsaturated halide to the corresponding unsaturated alcohol which comprises reacting an allyl type unsaturated halide containing at least four carbon atoms to the molecule with more than an equivalent quantity of a metal hydroxide of the general formula $M(OH)x$, wherein M represents an alkali metal or an alkaline earth metal, $x$ representing one in the former case and two in the latter, in the presence of at least an equivalent amount of water at a temperature of from about 80° C. to about 250° C. and at a superatmospheric pressure at least equal to the combined vapor pressures of the constituents of the reaction mixture at the operating temperature while agitating the reaction mixture to avoid local acidity whereby substantially complete conversion of the unsaturated halide to the corresponding unsaturated alcohol is effected.

3. A process for the conversion of an allyl type unsaturated halide to the corresponding unsaturated alcohol which comprises reacting an allyl type unsaturated halide containing at least four carbon atoms to the molecule with more than an equivalent amount of an alkaline earth metal hydroxide in the presence of at least an equivalent amount of water at a temperature of from about 80° C. to about 250° C. and at a superatmospheric pressure at least equal to the combined vapor pressures of the constituents of the reaction mixture at the operating temperature while agitating the reaction mixture to avoid local acidity whereby substantially complete conversion of the unsaturated halide to the corresponding unsaturated alcohol is effected.

4. A process for the production of unsaturated alcohols from allyl type unsaturated halides which comprises reacting an allyl type unsaturated halide containing an unsaturated tertiary carbon atom not more than once removed from a saturated monohalogenated carbon atom with more than an equivalent quantity of a basic metal compound, in the presence of at least an equivalent amount of water at a temperature of from about 80° C. to about 250° C. and at a superatmospheric pressure at least equal to the combined vapor pressures of the constituents of the reaction mixture at the operating temperature, whereby substantially complete conversion of the unsaturated halide is effected in a period of time not substantially greater than about one hour.

5. A process for the conversion of an allyl type unsaturated halide to the corresponding unsaturated alcohol which comprises reacting an allyl type unsaturated halide containing an unsaturated tertiary carbon atom contiguous to a saturated monohalogenated carbon atom with more than an equivalent quantity of an alkaline earth metal hydroxide in the presence of at least an equivalent amount of water at a temperature of from about 80° C. to about 250° C. and at a superatmospheric pressure at least equal to the combined vapor pressures of the constituents of the reaction mixture at the operating temperature while agitating the reaction mixture to avoid local acidity, whereby substantially complete conversion of the unsaturated halide to the corresponding unsaturated alcohol is effected.

6. A process for the conversion of isobutenyl chloride to isobutenol which comprises reacting isobutenyl chloride with more than an equivalent quantity of calcium hydroxide in the presence of at least an equivalent amount of water at a temperature of from about 80° C. to about 250° C. and at a superatmospheric pressure at least equal to the combined vapor pressures of the constituents of the reaction mixture at the operating temperature while agitating the reaction mixture to avoid local acidity, whereby substantially complete conversion of the isobutenyl chloride to isobutenol is effected.

7. In a process for the production of useful organic compounds from a mixture of allyl type unsaturated halides containing at least four carbon atoms to the molecule and vinyl type unsaturated halides the steps which comprise heating the mixture of unsaturated halides with a basic metal compound, in an amount more than equivalent to the allyl type halide-content of the mixture, in the presence of at least an equivalent amount of water at a temperature of from about 80° C. to about 250° C. and at a superatmospheric pressure at least equal to the combined vapor pressures of the constituents of the reaction mixture at the operating temperature, whereby the allyl type unsaturated halides are substantially completely converted to unsaturated alcohols while the vinyl type unsaturated halides are substantially unaffected, and subsequently separating the vinyl type unsaturated halides from the reaction mixture.

8. In a process for the production of an unsaturated alcohol from a mixture of allyl type unsaturated halides containing at least four carbon atoms to the molecule and vinyl type unsaturated halides the steps which comprise heating the mixture of unsaturated halides with an amount of an alkaline earth metal hydroxide more than equivalent to the allyl type halide-content of the reacted mixture in the presence of at least an equivalent amount of water at a temperature of from about 80° C. to about 250° C. at a superatmospheric pressure at least equal to the combined vapor pressures of the constituents of the reaction mixture at the operating temperature while agitating the reaction mixture to avoid local acidity, whereby substantially complete conversion of the allyl type unsaturated halides to unsaturated alcohols is effected while the vinyl type unsaturated halides are substantially unaffected, and subsequently separating the vinyl type halides from the reaction mixture.

9. In a process dealing with the alkaline treatment of a mixture of isobutenyl chloride and isocrotyl chloride, the steps which comprise heating the mixture with a quantity of a basic metal compound more than equivalent to the isobutenyl chloride in the presence of at least an equivalent quantity of water at a temperature of from about 80° C. to about 250° C. under a superatmospheric pressure at least equal to the combined vapor pressure of the constituents of the reaction mixture at the operating temperature whereby the isobutenyl chloride is substantially completely converted to isobutenol and the isocrotyl chloride is substantially unaffected, and subsequently separating the isocrotyl chloride from the reaction mixture.

MIROSLAV W. TAMELE.
HERBERT PETER AUGUSTUS GROLL.